Sept. 12, 1961 T. F. HERRON, JR 2,999,388
ELECTRICAL PROBE
Filed Nov. 13, 1958
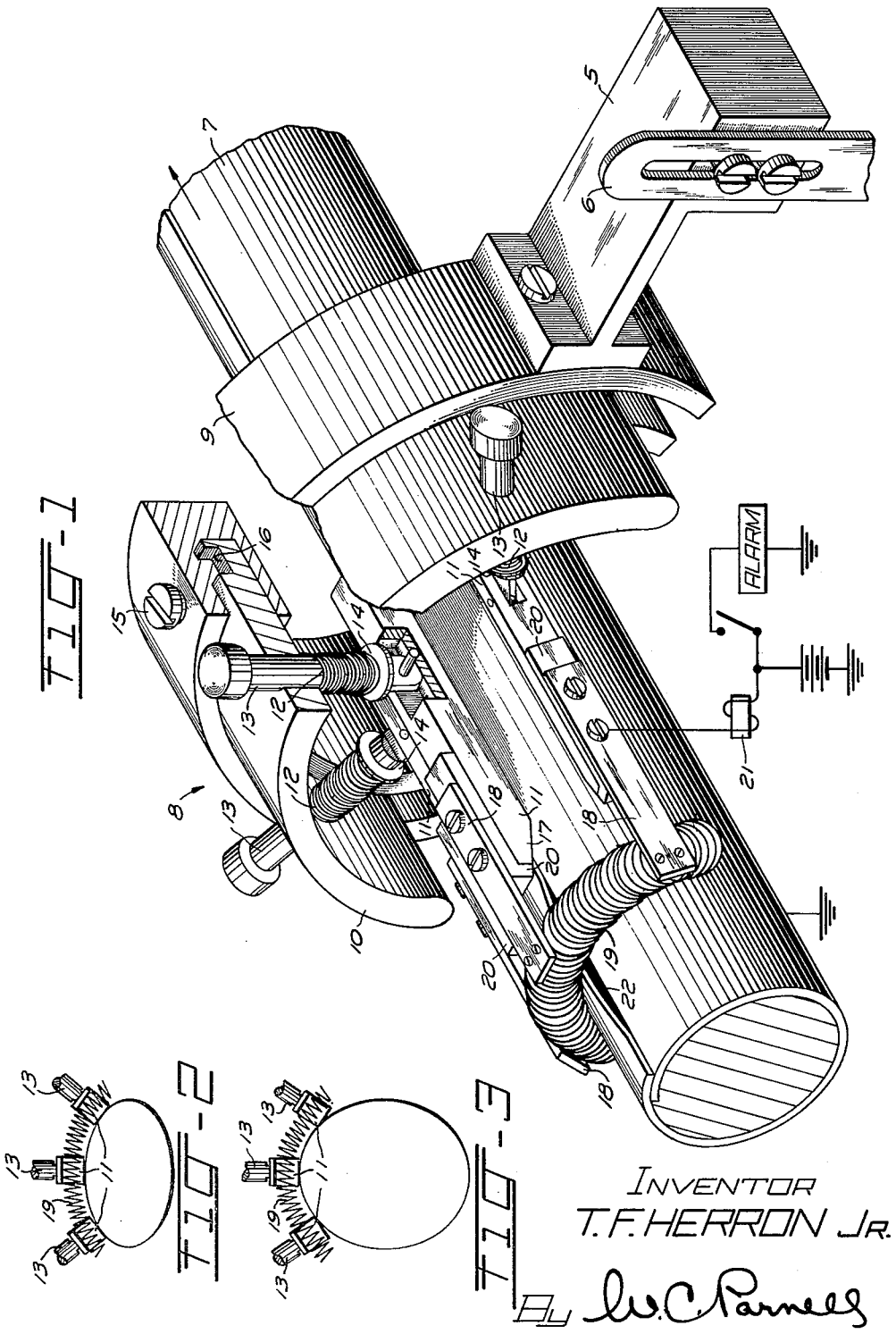
INVENTOR
T. F. HERRON JR.
By W. C. Parnell
ATTORNEY United States Patent Office 2,999,388
Patented Sept. 12, 1961

2,999,388
ELECTRICAL PROBE
Thomas F. Herron, Jr., Trenton, N.J., assignor to Western Electric Company, Incorporated, New York, N.Y., a corporation of New York
Filed Nov. 13, 1958, Ser. No. 773,630
5 Claims. (Cl. 73—432)

This invention relates to electrical probing devices for use in detecting surface irregularities in articles and particularly to a probe for detecting raised irregularities in longitudinally moving elongated articles.

One application of the invention is in the testing of seams in the metal sheathing of cables of the type disclosed in Patent 2,589,700 to H. G. Johnstone. The sheathing is fabricated by transversely forming a strip of sheet metal around an advancing cable core with the edges thereof meeting in a butting or overlapping longitudinally extending seam which is continuously soldered or welded together. The seam must be tested and defects therein repaired before a final plastic coating can be applied over the sheathing. In the main, the defects are caused by faulty soldering or welding and where the edges of the metal strip are not bonded together they form raised portions protruding from the line of the good portion of the seam. Heretofore, seam defect detecting systems, such as are disclosed in co-pending applications of D. A. Hughes, Serial No. 628,129, filed December 13, 1956, now Patent Number 2,886,966, and C. A. Hallam-T. F. Herron, Jr., Serial No. 635,371, filed January 22, 1957, have been incorporated into cable fabricating lines. While these systems have been successful in detecting many of the defects, they have not been completely successful in detecting defects when, as a result of twist produced in the sheathing resulting from the manufacturing process, the seam deviates or drifts from its normal longitudinal path as the cable is advanced along the fabricating line. Other factors tendings to complicate the detection of these defects are those due to variations in shape or curvature of the explored surface of the advancing article.

It is therefore the object of this invention to detect raised irregularities in a substantial area of the surface of a moving elongated article, such as the area in which the aforementioned seam may drift.

According to the general features of the invention, a probe having a plurality of elements disposed across and in sliding engagement with the moving elongated article, is provided with extensions for supporting a coiled helical spring transverse the article and at a predetermined spacing from the surface portion thereof in which the raised defects such as open seam portions may be located. The elements riding on the article shape the spring to conform to the adjacent surface of the article so that any raised irregularity protruding a distance greater than the predetermined spacing will make contact with the spring. The mechanical contact between the defect and the spring may be used to actuate an alarm as is taught by the aforementioned applications.

These and other features of the invention will be more fully understood from the following detailed description when taken in conjunction with the accompanying drawing, in which:

FIG. 1 is an isometric view of a preferred embodiment of the probe illustrating how it may be positioned on the sheathing of an advancing cable for detecting seam defects therein, and FIGS. 2 and 3 are simplified partial end views of the probe showing how it automatically adjusts itself to changes in the shape of the advancing article.

Referring now to the drawing, the probe is attached to a bracket 5 secured to an upright support 6 located along the path of a cable 7 advancing in the direction of the arrow. In practice, this may be along the cable fabricating line at a position beyond the exit end of the seam soldering station. A frame 8 consisting of a fixed, arcuately shaped, slotted member 9, is mounted on the bracket 5 and provides a support for an arcuately shaped member 10 positioned and movable within the slot of member 9. This structure permits moving the sensing parts of the probe, as discussed below, to a desired position around the advancing cable 7. The member 10 may be secured in any adjusted position in the slotted member 9, a set screw 15 being provided which locks against the member 10 in a groove 16 thereof. Bracket 5 is movable vertically on member 6 such that the members 9 and 10 may be aligned concentrically with the cable 7.

Surface or sheathing engaging elements 11 are disposed across the moving cable 7 and are held in pressure contact therewith by means of compressed springs 12 on guide rods 13. The springs exert a force between the inner surface of member 10 and washers 14 fixed to the rods. The rods are pivotally connected to the surface engaging elements 11 and are aligned in lines extending radially from the center of curvature for the arcuately shaped member 10 which is, in normal practice, the major axis of the advancing cable. Since the rods are movable radially, the probe may be utilized on cables of varying diameters. The elements 11 are preferably made of a metal harder than the steel metal sheathing so as to minimize wear resulting from the sliding engagement with the moving cable sheathing. The cable entrance end 17 of each element is bevelled in order that surface irregularity in the sheathing will ride under the element 11 without impact therewith. The elements 11 are pivotally connected to the rods 13 to permit them to rock slightly to accommodate gradual variations in the sheathing surface.

Extensions or spring support members 18 on the cable entrance end of the elements 11 are attached to and support a coiled helical spring 19 at a predetermined distance from the cable sheathing, as seen in FIGS. 2 and 3. The spring 19 and extensions 18 are electrically isolated from the elements 11 by means of insulating spacers 20 therebetween. Electrical connection is made to one of the extensions 18 for connecting the spring in an alarm circuit 21. Since the elements 11 ride in contact with the sheathing of the cable, the extensions 18 form the spring to the shape of the surface of the sheathing passing beneath it. As seen in FIG. 2 where the cable is flattened or egg-shaped, the middle element 11 will occupy a lower-than-normal position, thereby reducing the curvature of the spring 19, while in the opposite case of FIG. 3, the middle element 11 will occupy a higher-than-normal position such that the curvature of the spring 19 will be greater. In either case, the spacing between the spring and the major portion of the sheathing therebeneath is substantially uniform.

Seamed defects, such as indicated by numeral 22 (FIG. 1), protruding higher than the normal spacing between the sheathing and the adjacent spring 19 make contact with the spring. Since the cable sheathing is normally grounded through the fabricating apparatus, whenever the spring makes contact with the sheathing, the alarm circuit will be closed between the grounded sheathing, the spring 19, the extension 18, and the energizing source of the alarm circuit 21 such that the relay thereof will close to energize the alarm.

It is to be understood that while the above description relates to the testing of seams in round or elliptical cable sheathings, it could be used equally effectively in testing for other protruding surface irregularities in pipes and other curved or flat surfaced elongated articles. For applications where the contour or surface of the article is other than round or elliptical, the relative alignment of the rods and therefore the shape of the support frame 8 will vary to permit the elements 11 to ride on the surface and shape the spring 19 accordingly. For a substantially flat article, for example, the frame would be substantially straight and rods 13 may be reciprocatably mounted parallel to one another. Numerous other arrangements may be readily devised by those skilled in the art which will embody the principles of the invention and fall within the spirit and scope thereof.

What is claimed is:

1. An electrical probe for detecting raised irregularities in a longitudinally moving elongated article having an electrically conductive surface which comprises an electrically conductive helical spring, a plurality of parallel conductive supports affixed and extending to one side of the spring, the spring being mounted on the supports in a substantially arcuate path extending transverse to the elongated article, a plurality of insulated support elements, one for each of the parallel conductive supports, affixed to respective ones of said supports, a rigid frame means for supporting the elements in contact with the article, the parallel conductive supports being affixed to the helical spring and to the elements to support the helical spring above the non-raised article surface and in spaced relation to the non-raised portion of the surface, alarm circuit means connected between one or more of the conductive supports and the conductive surface of the article, the helical spring being spaced from the article surface by the elements so that a predetermined raise in the surface level completes the electrical circuit and actuates the alarm.

2. A probe according to claim 1 adapted for use on pipe-like articles having circular or elliptical cross-sections, in which the supporting means holds the elements for movement along lines angularly disposed with respect to one another and emanating from a common point so as to shape the spring to conform to the adjacent surface of the moving article.

3. An electrical probe for detecting raised irregularities in a longitudinally extending seam in a longitudinally moving elongated cylindrical article of electrically conductive material in the area of the seam, which comprises a conductive coiled helical spring, a plurality of elements for making sliding engagement on the moving article, a frame, means for mounting the frame in fixed relation with respect to the path of the moving article, rods connected to the elements, means for slidably supporting the rods in spaced relation on the frame for moving the elements toward and away from the article along radial lines extending substantially from the central axis of the article, means for urging the elements into engagement with the article, conductive spring support members attached in spaced relation to one side of the spring and in electrical contact therewith, the spring being mounted on the support members transverse to the cylindrical article and disposed circumferentially thereto, means for insulatingly mounting the support members on the elements for supporting the other side of the spring at a predetermined space from the seam in the moving article so that seam irregularities protruding from the article in excess of said predetermined spacing will engage said other side of the spring, means for moving the rod supporting means on the frame around the cylindrical moving article, and electrical alarm circuit means connected to the spring support members and the electrically conductive material of the article for giving an alarm when irregularities engage the spring.

4. An electrical probe according to claim 3 in which the frame is provided with a first arcuately shaped fixed member and the means for slidably supporting the rods comprises a second arcuately shaped member movable on the first member for moving the spring to cover a desired portion of the moving cylindrical article.

5. An electrical probe for detecting raised irregularities in a longitudinally extending article having an electrically conductive surface, which comprises a frame, a plurality of guide shoes movably supported in the frame and adapted to extend along the surface of the article, a plurality of electrically conductive supports attached respectively to individual ones of the guide shoes and electrically insulated therefrom, the supports extending in the longitudinal direction of the article, a helical spring attached to the ends of the supports and maintained by the shoes and supports a predetermined distance above the non-raised surface of the article, the spring being mounted on the supports in a substantially arcuate path extending transverse to the longitudinally extending article and an electric alarm circuit including the helical spring, at least one support, an alarm, and the surface of the article so that raised irregularities protruding from the article in excess of the predetermined spacing will contact the spring, close the electrical circuit and actuate the alarm.

References Cited in the file of this patent

UNITED STATES PATENTS

| | | |
|---|---|---|
| 712,201 | Norden | Oct. 28, 1902 |
| 2,701,470 | Ames | Feb. 8, 1955 |
| 2,701,471 | Boynton | Feb. 8, 1955 |
| 2,710,394 | Hallam et al. | June 7, 1955 |
| 2,886,966 | Hughes | May 19, 1959 |
| 2,929,245 | Fischer | Mar. 22, 1960 |